(12) United States Patent
Barajas Gonzalez et al.

(10) Patent No.: US 9,935,837 B2
(45) Date of Patent: Apr. 3, 2018

(54) PHYSICAL CHANGE TRACKING SYSTEM FOR ENCLOSURES WITHIN DATA CENTERS

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Harry McGregor, Tucson, AZ (US); Christopher B. Moore, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 410 days.

(21) Appl. No.: 14/663,841

(22) Filed: Mar. 20, 2015

(65) Prior Publication Data

US 2016/0277248 A1   Sep. 22, 2016

(51) Int. Cl.
  *G06F 15/173*  (2006.01)
  *H04L 12/24*  (2006.01)
  *H04L 12/26*  (2006.01)

(52) U.S. Cl.
  CPC ........ *H04L 41/0853* (2013.01); *H04L 41/147* (2013.01); *H04L 43/08* (2013.01)

(58) Field of Classification Search
  CPC .... H04L 41/0853; H04L 41/147; H04L 43/08
  USPC ...................................................... 709/224
  See application file for complete search history.

(56) References Cited

U.S. PATENT DOCUMENTS

| | | | | |
|---|---|---|---|---|
| 6,553,511 | B1* | 4/2003 | DeKoning | G06F 11/1076 707/999.1 |
| 7,031,778 | B2* | 4/2006 | Hsiung | G05B 15/02 340/539.22 |
| 7,436,303 | B2* | 10/2008 | Tourrilhes | G06Q 10/06 235/385 |
| 8,854,822 | B2 | 10/2014 | Hazzard et al. | |
| 9,218,729 | B2* | 12/2015 | Meganathan | G06F 3/04817 |
| 9,396,253 | B2* | 7/2016 | Porpora | G06F 17/30699 |
| 9,509,794 | B2* | 11/2016 | Hussain | H04L 67/2819 |
| 2005/0021485 | A1* | 1/2005 | Nodelman | G06Q 10/109 706/21 |
| 2005/0222969 | A1* | 10/2005 | Yip | H04L 41/0813 |
| 2006/0092019 | A1* | 5/2006 | Fallon | G08B 13/19656 340/541 |
| 2006/0123151 | A1* | 6/2006 | Wurst | G06F 3/1207 710/19 |
| 2006/0171570 | A1* | 8/2006 | Brendley | G08B 13/10 382/115 |
| 2006/0290921 | A1* | 12/2006 | Hotelling | G01S 17/026 356/152.2 |

(Continued)

*Primary Examiner* — Imad Hussain
(74) *Attorney, Agent, or Firm* — Griffiths & Seaton PLLC

(57) ABSTRACT

Embodiments for implementing change control management in computing center environments by a processor. A determination is made of a present status of a monitored component of a computing device in the computer center environment. A recording, using at least one sensor device, of a change of the present status of the monitored component, including a time stamp and information identifying an owner of the change is made. An analysis of a trend of status of the monitored component over time is made to generate an accurate prediction of future activity towards the monitored component.

18 Claims, 6 Drawing Sheets

(56) References Cited

U.S. PATENT DOCUMENTS

| | | | | |
|---|---|---|---|---|
| 2009/0315678 | A1* | 12/2009 | Padmanabhan | H04Q 9/00 340/10.1 |
| 2012/0013936 | A1* | 1/2012 | Sawada | G06K 15/402 358/1.14 |
| 2013/0159413 | A1* | 6/2013 | Davis | H04L 29/0872 709/204 |
| 2013/0197968 | A1* | 8/2013 | Davis | H04L 67/306 705/7.29 |
| 2013/0202210 | A1* | 8/2013 | Ryoo | G06K 9/00771 382/195 |
| 2014/0354418 | A1* | 12/2014 | Leonard | G06K 7/10297 340/10.41 |
| 2015/0035437 | A1* | 2/2015 | Panopoulos | F21V 14/02 315/112 |
| 2015/0227784 | A1* | 8/2015 | Roy | G06K 9/00771 382/103 |
| 2015/0279155 | A1* | 10/2015 | Chun | G07F 17/3241 463/25 |
| 2015/0323914 | A1* | 11/2015 | Majewski | G05B 15/02 700/86 |
| 2016/0188424 | A1* | 6/2016 | Walls | G06F 11/1662 714/6.3 |

* cited by examiner

PHYSICAL CHANGE TRACKING SYSTEM FOR ENCLOSURES WITHIN DATA CENTERS

BACKGROUND OF THE INVENTION

Field of the Invention

The present invention relates in general computing systems, and more particularly to, various embodiments for change management in computing environments.

Description of the Related Art

Today with modern technology, large volumes of data are storable on disk drives, along with processing resources in rack mount component form factor in large computing center environments. These computer center environments may, for example, house hundreds of individual server components. Some servers may be dedicated to storage of data, while other servers may handle processing tasks. Still others may contain networking, security, or other resources.

SUMMARY OF THE INVENTION

Various embodiments for implementing change control management in computing center environments by a processor are provided. In one embodiment, by way of example only, a method for implementing change control management in computing center environments by a processor is provided. A present status of a monitored component of a computing device in the computer center environment is determined. A change of the present status of the monitored component is recorded, including a time stamp and information identifying an owner of the change. A trend of status of the monitored component is monitored over time to generate an accurate prediction of future activity towards the monitored component.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
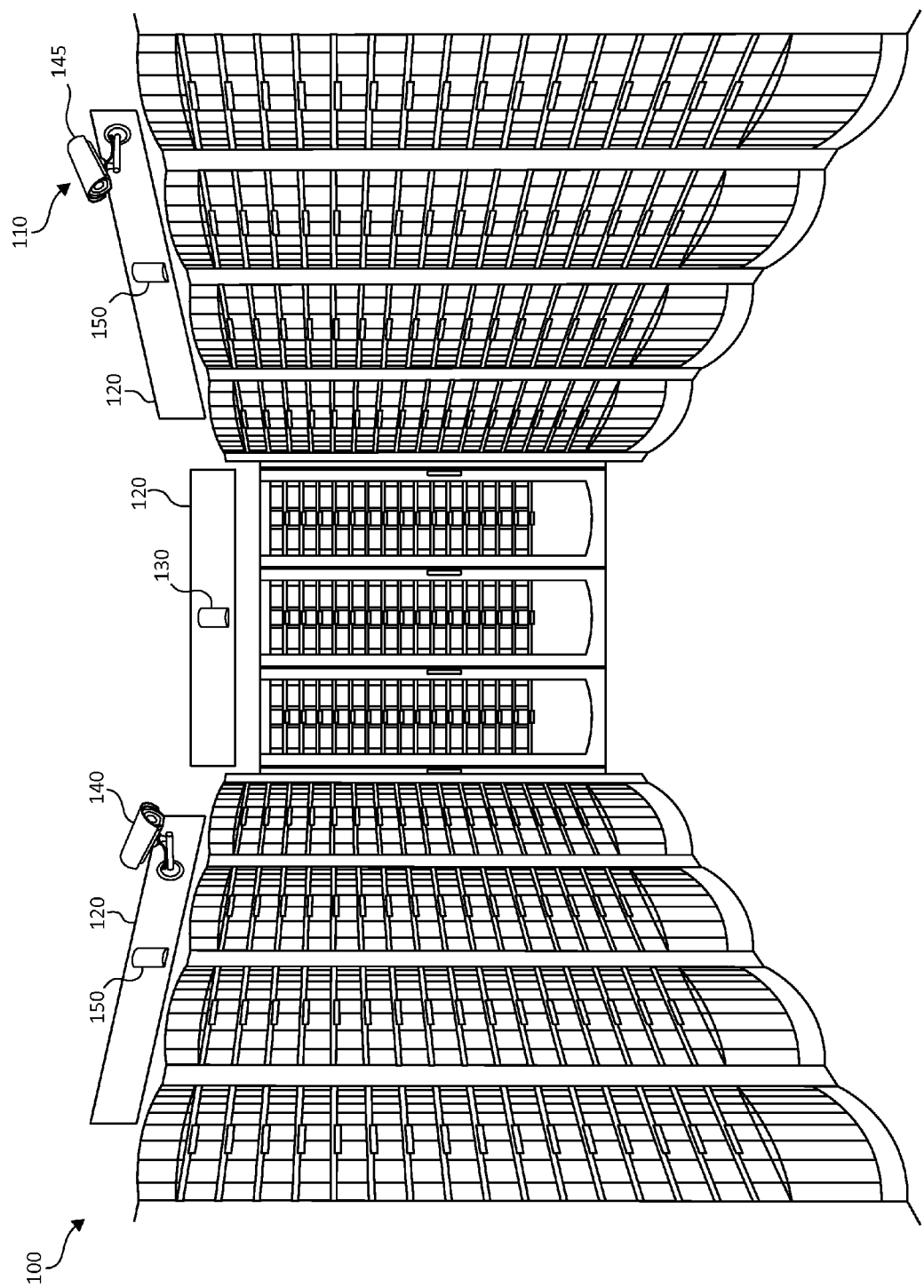
FIG. 1 is an illustration of a computing center environment, in which various aspects of the present invention may be realized.

In today's large data centers with hundreds or even thousands of components enclosed within individual racks, tracking changes performed on each component has become increasingly challenging. It is common practice for each individual component to retain its own configuration records and track changes that are made. The systems implementing this tracking, however, rarely consider modifications to other components, many of which are interconnected to them.

The lack of holistic monitoring can make auditing configuration changes, both in software configuration and modifications to attached hardware, very difficult. In many computing center environments, individual components are mounted within the same rack enclosure to form complex systems. As these systems become increasingly interdependent on individually interconnected components, it becomes essential to maintain records of specific hardware and software configuration variables in order to ensure that the individual components of the system work together properly.

When investigating individual component recording, reporting of failures and subsequent maintenance tasks, it is quite common to find that a failure that is presently being reported was the result of a change done during previous maintenance tasks. It is also very common that the details of that previous task did not contain adequate information about either the changes within the individual component, another component that the particular component interacts with, or even who performed the changes in the first place. This phenomenon may cause extended service windows at best, and in many cases may lead to production impact to the customer's environment.

In addition to the foregoing, there are considerable costs due to the additional workload required to find out exactly what was changed previously and often escalation to next level support groups to perform deeper analysis to fully understand the effects of changes that were done in the past that directly impacted the current incident or change request.

In view of these challenges, a need exists for a holistic, system-wide approach for implementing change management in computing centers, such as typical environments with a wide array of components in interconnected racks. In addition, a need exists for mechanisms whereby not only the change that took place is determined, but who or what caused the change.

In one embodiment, the mechanisms of the illustrated embodiments implement an array of sensors that permit the detection of the present status of physical components, internal and external, within an enclosure, as well as specific parts that interconnect to the system. These sensors may include sensors such as an imaging sensor, which serves to capture images of the person, as well as other sensors that serve to provide an inventory of monitored components and sub components, both internal and external to the enclosure. These sensors are utilized every time the opportunity for a change is presented.

With this information, data center administrators, for example, can easily access and generate reports that include the identity of the operators/technicians, as well as actions performed as it relates to the current status of the components being monitored. With each change identified by the sensors, the mechanisms of the illustrated embodiments record this information in a database so that historical tracking is both accurate and consistent. By utilizing the mechanisms of the illustrated embodiments, data center administrators can dramatically improve their ability to track both the physical and software modifications and to easily know the identity of the person making those modifications.

The database that is generated allows for fully audit compliant recording of changes as it pertains to the status of its internal components, which then allows for data center administrators, for example, to efficiently determine where previous changes could be causing new issues. Additionally beyond data collection, the mechanisms of the illustrated embodiments perform various trend analysis, which permits the accurate prediction of future miss configurations based on the type of work being performed or the technician(s) involved.

The mechanisms of the illustrated embodiments may implement various methodologies to accomplish the innovative change management functionality previously described. These include the following. In one embodiment, for example, a user may define specific internal and external components and defines "normal" status to be monitored. Using a combination of sensors, such as motion, light meters, infrared photo, and standard photo with flash, the mechanisms of the illustrated embodiments identify changes in the status of monitored components within an enclosure.

In a further embodiment, records of each component may be retained by, for example, using available sensors in conjunction with a range of techniques to detect the relative position of components based upon uniquely identifiable shape, specially designed reflective stickers, radio-frequency identification (RFID) tags, or quick response (QR) code tags.

In still a further embodiment, when the opportunity of change occurs, either by way of enclosure door status changing or other initiating event in front of the rack), a visual inventory of the monitored components may be performed using available sensors. At the same time, an image of the operator may be recorded for identification purposes.

In the event that an initiating event remains unresolved, for example the door remains open for an extended period of time, the mechanisms of the illustrated embodiments may leverage the array of motion, light sensing and infrared sensors to determine when an operator is present and record any changes which occur and the identity of the operator (or in other words, the "owner" of the change).

During periods of unresolved initiating events, states of tracked components may be analyzed and compared to the pre-defined "normal" state. If a difference is detected, the change of status is recorded including the time-stamp and image of operator who conducted the change.

An internal database may be continuously updated to track of all the changes performed and may contain time-stamps, descriptions of the changes and a photo of the operator, for example.

The management software that may be implemented by the mechanisms of the illustrated embodiments may be configured to interact with customer change management systems to verify that the change being performed are authorized at all times. In addition, the implemented management software may also be configured to interact with customer change management systems to ensure that the changes being requested (change orders/tickets) are actually performed.

Turning now to the Figures, FIG. 1 illustrates a computing center environment 100, such as a server room 100, data center 100, or other similar environment featuring a number of rack-mounted server components that are interconnected to form a complex system. In one embodiment, perhaps as an integrated portion of an enclosure, or other rack component to which the servers are mounted, a mounting platform 120 is shown. A number of sensor devices 110 are mounted to the mounting platform 120, although it should be noted that the illustration depicted is merely representative of the locations, sizes, etc., of devices that would be installed in such an environment 100.

The sensor devices may include such devices as a motion sensor 130, a visible camera 140 (with or without flash enhancement), an infrared camera 145, and a light meter 150. The various sensor devices may act individually, or in concert to obtain status information of the environment 100 and/or any change information concerning the environment 100. As one of ordinary skill in the art will appreciate, the sensors may be configured for differing functionality. For example, the visible camera 140 may obtain visible images of the environment 100, operators and technicians (not shown), or other visibly obtained information. The infrared camera 145 may obtain infrared images of objects in the vicinity of the camera 145. The motion sensor 130 may detect movement that occurs in the environment 100 (such as, for example, movement of a technician throughout the environment 100).

As one of ordinary skill in the art, the various sensors shown herein are representative of other sensors that may be employed in the environment 100. These sensors may also include such devices as radio frequency identification (RFID) devices, closed-circuit television (CCTV), bar code scanners/readers, auditory detectors (e.g., microphones), global positioning system (GPS) devices, and other similar devices.

In one embodiment, the computing environment 100 is a datacenter environment 100. The datacenter environment 100 may include a number of servers (e.g., Lenovo® System x3650, HP® ProLiant DL Rack Mount Servers) including a plurality of physical server devices. A physical server device (e.g., Lenovo® System x3850 M2, HP® Alpha systems) is a computing device including, without limitation, at least one processor, at least one memory device, etc. The computing device may run at least one server application, e.g., Apache HTTP server.

Figure 2:
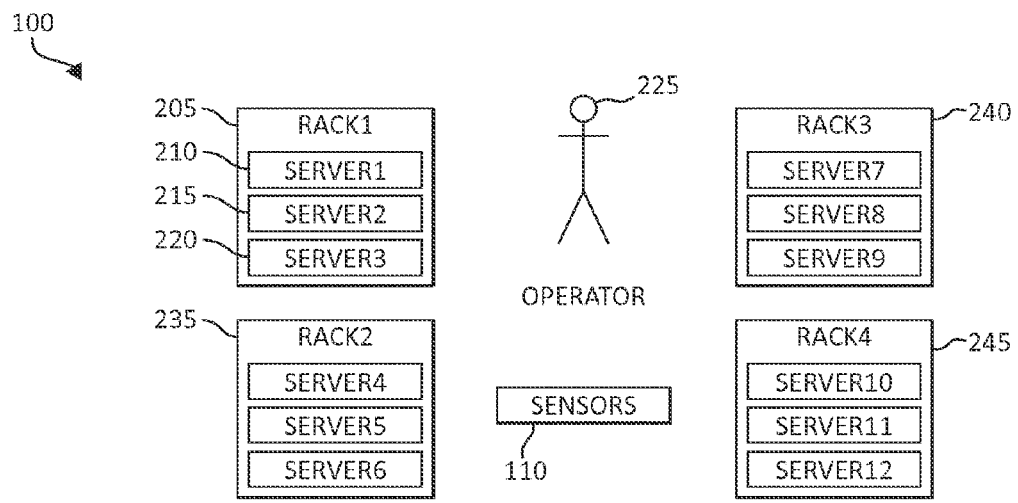
FIG. 2 is a block diagram of an exemplary representation of a computing server environment including servers on racks, one of a number of sensor components and an operator, here again in which aspects of the present invention may be realized.

FIG. 2 illustrates server devices in the datacenter 100 according to one embodiment of the present invention. In the datacenter 100, there exists a plurality of racks with servers, e.g., a rack 1 (205), a rack 2 (235), a rack 3 (240), a rack 4 (245). A rack includes a plurality of physical server devices. For example, the rack 1 (205) includes a plurality of server devices, e.g., a physical server device 1 (210), a physical server device 2 (215), a physical server device 3 (220), etc. The datacenter 100 includes the sensors 110. There may exist an operator 225, technician 225, or other personnel that enter the environment 100 to effect changes on the various servers 210, 215, 220, etc. components in the environment 100. One aspect of the present invention aims to determine an identity of the operator 225 responsible for affecting the change(s) in the environment 100.

Figure 3:
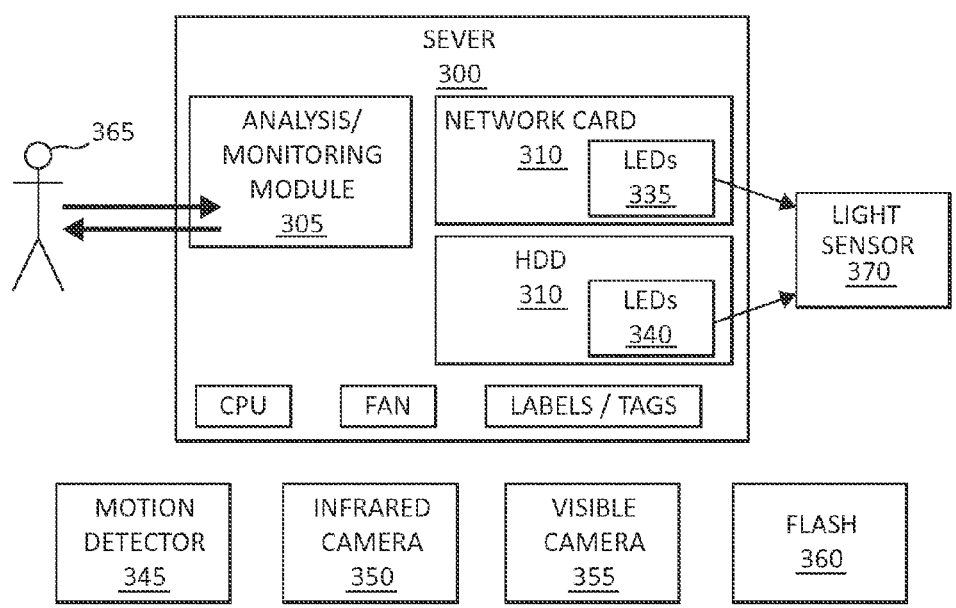
FIG. 3 is a block diagram of one of the servers of FIG. 2, previously, including a number of available monitoring sensor devices, again in which various aspects of the present invention may be implemented.

FIG. 3, following, illustrates components and/or properties in a physical server device 300 according to one embodiment of the present invention. The physical server device 300 exhibits at least one status (manifest as a physical property or otherwise). For example, a network card 310 may incorporate light emitting diodes (LEDs) 335 (as may hard disk drive (HDD) 320 incorporate LEDs 340. The LEDs 335, 340 may blink in accordance with the status of the server, card, or storage device, for example. The LEDs 335, 340 may blink a certain way to reflect the status therein. The light sensor 370 may recognize this blinking pattern to determine a particular status and/or whether the particular status has changed.

As shown, server 300 includes such associated devices as a central processing unit, or CPU, fan for cooling purposes, and labels/tags. The labels/tags associated with the server may include a RFID tag, containing information therein about, for example, a version of current hardware, firmware, or software associated with the server 300.

As previously described, a number of sensor devices, inclusive of light sensor 370, may be utilized to monitor the server 300 and record information about the current status of the monitored server 300 and whether the status has changed, and whether a particular operator 365 was responsible for the change. As depicted in the present figure, sensor devices include motion detector 345, infrared camera 350, visible camera 355, flash device 360, and previously mentioned light sensor 370. Each of the sensor devices 345, 350, 355, 360, and 370 may be connected to the analysis/monitoring module 305. The monitoring module 305 may implement monitoring functionality, as well as provide trend analysis of status changes over time as will be further described.

Figure 4:
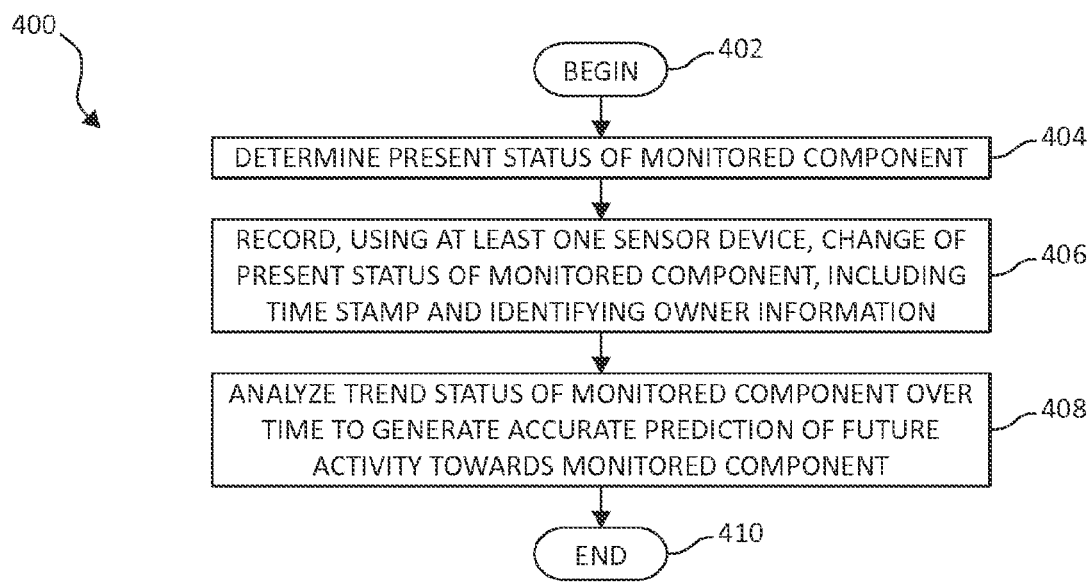
FIG. 4 is a flow chart diagram of an exemplary method for change management for monitored components in computing center environments, in which various aspects of the present invention may be implemented.

FIG. 4, following, illustrates an exemplary method 400 for implementing change management in a computing center environment by a processor, in which various aspects of the present invention may be implemented. Method 400 begins (step 402) with a determination of a present status of the monitored component (step 404). At least one sensor device records a change of the present status of the monitored component, including a corresponding time stamp and identifying owner information (step 406). The step of obtaining identifying ownership may include such functionality as obtaining a visible image of the technician and comparing the obtained image with images stored in a database to make a positive identification, for example.

In a following step 408, a trend status of the monitored component is analyzed over time. This may include such functionality as analyzing the recorded database of changes to determine if similar changes have been made in other server components, for example. The functionality may include examining other data obtained from other sensor devices to determine if overlap of information, cues, or other aspects associated with a particular change are seen. The method 400 then ends (step 410).

Figure 5:
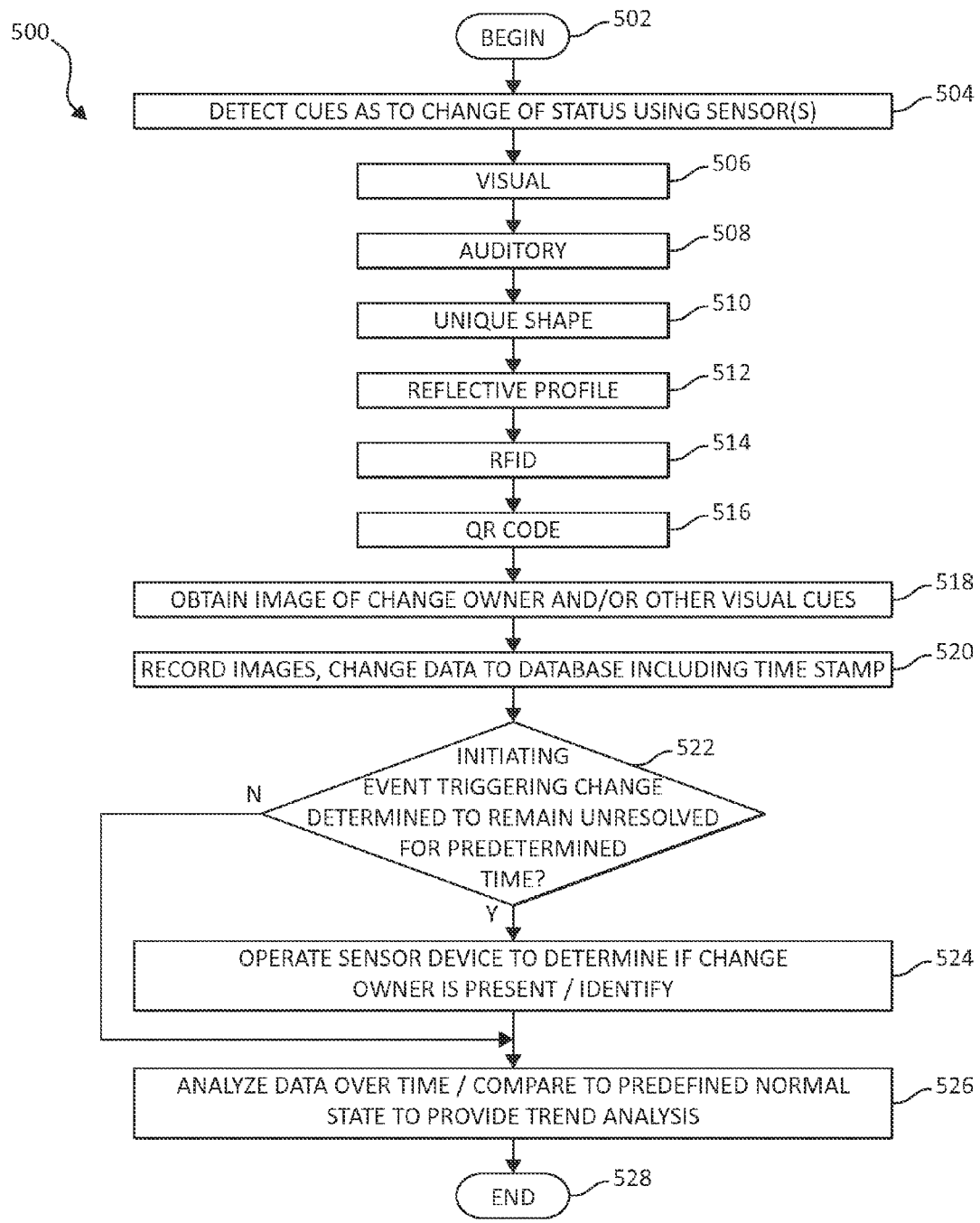
FIG. 5 is an flow chart diagram of an additional method for change management for monitored components in computing center environments, here again in which various aspects of the present invention may be implemented.

FIG. 5, following, illustrates an additional exemplary method 500 for implementing change management in computing center environments, again in which aspects of the present invention may be implemented. Method 500 begins (step 502) with the detection of cue(s) as to a change of status using various sensor devices (step 504). A number of cues may be examined by the various sensor devices as follows, such as visual (506), auditory (508), a unique shape (510), reflective profile (512), RFID signature (514) or QR code information (516).

In addition, an image of the owner responsible (i.e., "change owner") and/or other visual cues is obtained (step 518). The various information, cues, images, and the like (i.e., "change data") may be recorded to a database, including time stamp information corresponding to when the change behavior was detected (step 520).

In a following decision step, method 500 queries whether the initiating event triggering the change is determined to remain unresolved for more than a predetermined time (step 522). If so, one or more of the sensor devices may be operated subsequently to determine if the change owner is present, and possibly to obtain an identity of the change owner (step 524). Returning to step 522, if the initiating event is determined to be resolved, the method 500 moves to step 526, following, which analyzes the change data over time to compare the assembled data with information representative of a predefined normal state to, for example, provide comparative and trend analysis (step 526). The method 500 then ends (step 528).

Figure 6:
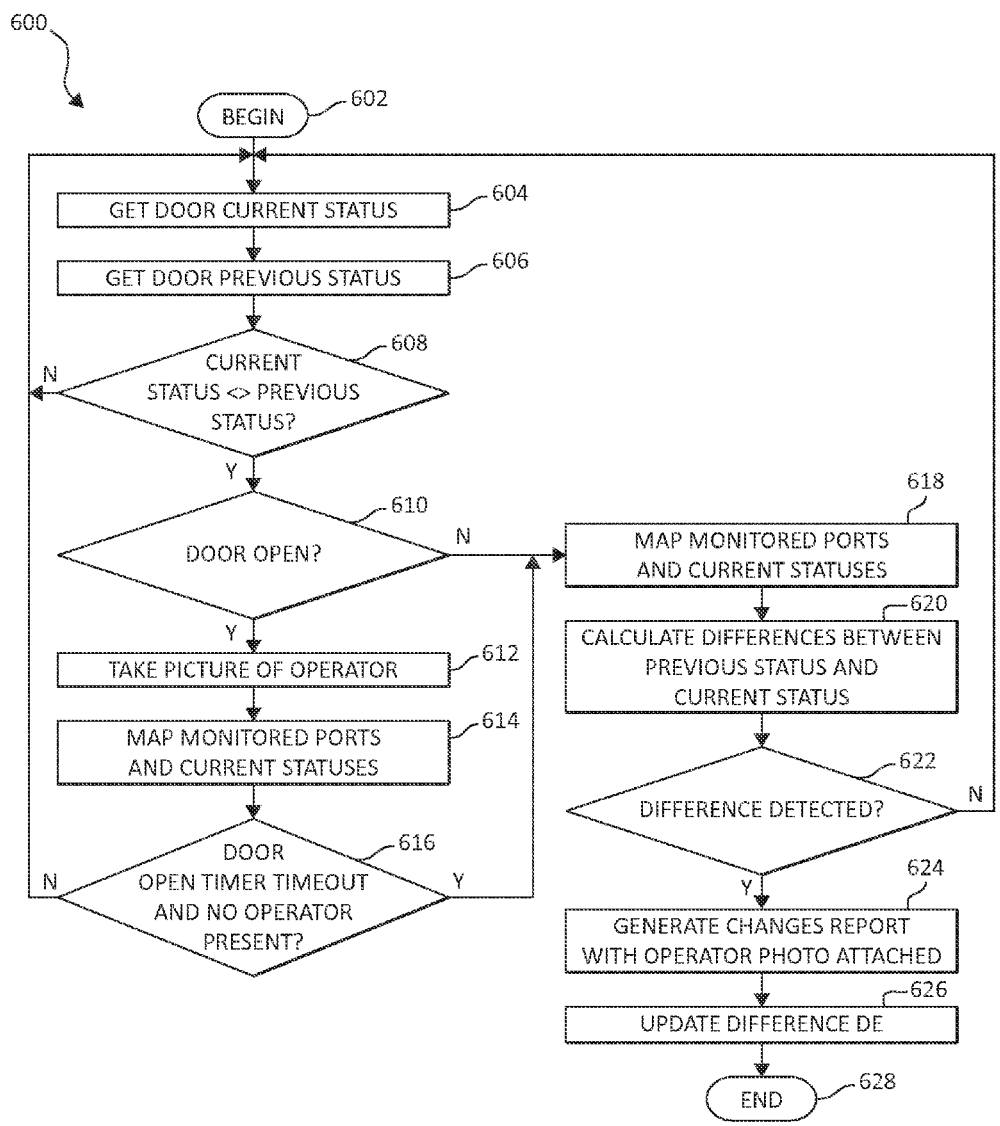
FIG. 6 is a flow chart diagram illustrating yet an additional exemplary method for change management for monitored components in computing center environments, again in which aspects of the present invention may be realized.

FIG. 6, following, illustrates yet another exemplary embodiment for implementing change management in which various aspects of the present invention may be seen as method 600. Method 600's functionality concerns itself, among other aspects, with a change event corresponding to the status of an access door of a server component in a computing center environment such as those previously seen. Method 600 begins (step 602) begins by obtaining a door current status (step 604) as well as the door's previous status (606).

Method 600 then queries whether the current status is determined to occur prior to, or successive to, the determined previous status (decision step 608). If yes, the method 600 moves to decision step 610, which then queries if the particular door is still ajar. If so, a visual image of the operator/change owner is obtained (step 612), and the monitored ports and current statuses of the affiliated component are mapped (step 614). If, in the following successive decision step 616, a door open timeout occurs and an operator is determined not to be present, the method 600 returns to step 604.

Returning to step 616, if the door open timeout occurs and the operator is determined to be present (also corresponding to the "No" output of decision step 610), the corresponding ports and current statuses are mapped (step 618). Differences between the previous status and current status are calculated (step 620). If, in a following decision step 622, a difference is detected above a certain threshold, a changes report is generated with a photo of the change owner/operator appended (step 624), and the difference database (DB) is updated (step 626). The method 600 then ends (step 628). Returning to decision step 622, if a significant enough difference is not detected, the method 600 returns to step 604 previously.

Figure 7:
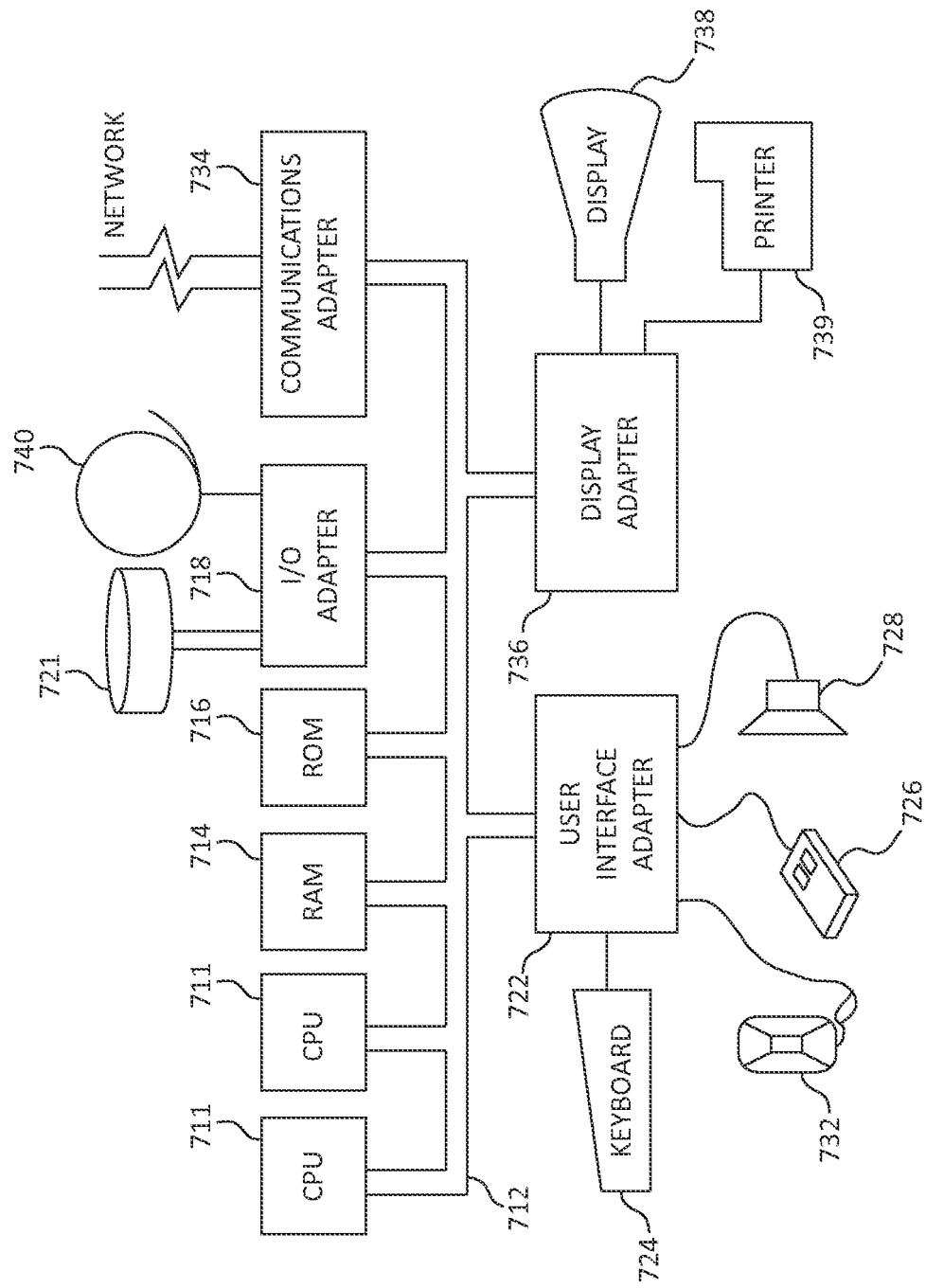
FIG. 7 is a block diagram of exemplary hardware components that may be implemented in various embodiments to perform various functionality associated with the present invention, such as performing monitoring and analysis functionality.

FIG. 7, following, illustrates an exemplary hardware configuration of a computing system running and/or implementing the method steps depicted in, for example, FIGS. 4-6, previously. The hardware configuration preferably has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting the system to a data processing network, the Internet, an Intranet, a local area network (LAN), etc., and a display adapter 536 for connecting the bus 512 to a display device 738 and/or printer 739 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for implementing change control management in computing center environments by a processor, comprising:
    determining a present status of a monitored component of a computing device in the computer center environment, the monitored component comprising a hardware device housed within and used by the computing device, and the computer center environment comprising a datacenter having a plurality of racks therein housing a plurality of the computing devices;
    recording, using at least one sensor device, a change of the present status of the monitored component, including a time stamp and information identifying an owner of the change; wherein recording the change of the present status further includes obtaining at least one of an image of the owner of the change for identification purposes by comparing the at least one image of the owner against a database of stored images to make a positive identification of the owner, and further obtaining an image of at least a portion of the monitored component to retain a visual inventory of the change; and
    analyzing a trend of status of the monitored component over time to generate an accurate prediction of future activity towards the monitored component.

2. The method of claim 1, wherein recording, using the at least one sensor device, the change of the present status of the monitored component includes implementing at least one of a motion detector, light meter, infrared camera, visible light camera, camera with accompanying flash to record an event of the monitored component in which the change of the present status of the monitored component occurs.

3. The method of claim 1, wherein determining the present status of the monitored component further includes implementing the at least one sensor device to detect a relative position of the monitored component based on at least one of a uniquely identifiable shape, a reflective profile, a Radio Frequency Identification (RFID) tag, and a Quick Response (QR) code tag.

4. The method of claim 1, wherein if an initiating event triggering the change in the present status is determined to remain unresolved for a predetermined period of time, the at least one sensor device is operated to gather information in an effort to determine if the owner of the change is present and an identity of the owner.

5. The method of claim 1, wherein during a time period of an unresolved initiating event, at least one state of the monitored component is analyzed and compared to a predefined normal state to determine whether any difference has occurred.

6. The method of claim 1, wherein recording, using at least one sensor device, a change of the present status of the monitored component further includes updating flail the database with one of the time stamp and the information identifying the owner of the change.

7. A system for implementing change control management in computing center environments, comprising:
    a processor, operational in the computing center environment, that:
        determines a present status of a monitored component of a computing device in the computer center environment, the monitored component comprising a hardware device housed within and used by the computing device, and the computer center environment comprising a datacenter having a plurality of racks therein housing a plurality of the computing devices,
        records, using at least one sensor device, a change of the present status of the monitored component, including a time stamp and information identifying an owner of the change; wherein recording the change of the present status further includes obtaining at least one of an image of the owner of the change for identification purposes by comparing the at least one image of the owner against a database of stored images to make a positive identification of the owner, and further obtaining an image of at least a portion of the monitored component to retain a visual inventory of the change, and
        analyzes a trend of status of the monitored component over time to generate an accurate prediction of future activity towards the monitored component.

8. The system of claim 7, wherein the processor, pursuant to recording, using the at least one sensor device, the change of the present status of the monitored component, implements at least one of a motion detector, light meter, infrared camera, visible light camera, camera with accompanying flash to record an event of the monitored component in which the change of the present status of the monitored component occurs.

9. The system of claim 7, wherein the processor, pursuant to determining the present status of the monitored component, implements the at least one sensor device to detect a relative position of the monitored component based on at least one of a uniquely identifiable shape, a reflective profile, a Radio Frequency Identification (RFID) tag, and a Quick Response (QR) code tag.

10. The system of claim 7, wherein the processor, pursuant to, if an initiating event triggering the change in the present status is determined to remain unresolved for a predetermined period of time, operates the at least one sensor device to gather information in an effort to determine if the owner of the change is present and an identity of the owner.

11. The system of claim 7, wherein the processor, during a time period of an unresolved initiating event, analyzes at least one state of the monitored component and compares the at least one state to a predefined normal state to determine whether any difference has occurred.

12. The system of claim 7, wherein the processor, pursuant to recording, using at least one sensor device, a change of the present status of the monitored component, updates flail the database with one of the time stamp and the information identifying the owner of the change.

13. A computer program product for implementing change control management in computing center environments by a processor, the computer program product comprising a non-transitory computer-readable storage medium having computer-readable program code portions stored therein, the computer-readable program code portions comprising:
    a first executable portion that determines a present status of a monitored component of a computing device in the computer center environment, the monitored component comprising a hardware device housed within and used by the computing device, and the computer center environment comprising a datacenter having a plurality of racks therein housing a plurality of the computing devices;
    a second executable portion that records, using at least one sensor device, a change of the present status of the monitored component, including a time stamp and information identifying an owner of the change; wherein recording the change of the present status further includes obtaining at least one of an image of the owner of the change for identification purposes by comparing the at least one image of the owner against a database of stored images to make a positive identification of the owner, and further obtaining an image of at least a portion of the monitored component to retain a visual inventory of the change; and a third executable portion that analyzes a trend of status of the monitored component over time to generate an accurate prediction of future activity towards the monitored component.

14. The computer program product of claim 13, further including a fourth executable portion that, pursuant to recording, using the at least one sensor device, the change of the present status of the monitored component, implements at least one of a motion detector, light meter, infrared camera, visible light camera, camera with accompanying flash to record an event of the monitored component in which the change of the present status of the monitored component occurs.

15. The computer program product of claim 13, further including a fourth executable portion that, pursuant to determining the present status of the monitored component, implements the at least one sensor device to detect a relative position of the monitored component based on at least one of a uniquely identifiable shape, a reflective profile, a Radio Frequency Identification (RFID) tag, and a Quick Response (QR) code tag.

16. The computer program product of claim 13, further including a fourth executable portion that, pursuant to, if an initiating event triggering the change in the present status is determined to remain unresolved for a predetermined period of time, operates the at least one sensor device to gather information in an effort to determine if the owner of the change is present and an identity of the owner.

17. The computer program product of claim 13, further including a fourth executable portion that, during a time period of an unresolved initiating event, analyzes at least one state of the monitored component and compares the at least one state to a predefined normal state to determine whether any difference has occurred.

18. The computer program product of claim 13, further including a fourth executable portion that, pursuant to recording, using at least one sensor device, a change of the present status of the monitored component, updates flail the database with one of the time stamp and the information identifying the owner of the change.

* * * * *